United States Patent
Yaginuma et al.

(10) Patent No.: US 9,843,063 B2
(45) Date of Patent: Dec. 12, 2017

(54) FUEL CELL

(71) Applicant: NISSAN MOTOR CO., LTD., Yokohama-shi, Kanagawa (JP)

(72) Inventors: Motoki Yaginuma, Yokohama (JP); Toshikazu Kotaka, Tokyo (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 577 days.

(21) Appl. No.: 14/384,255

(22) PCT Filed: Mar. 14, 2013

(86) PCT No.: PCT/JP2013/001742
§ 371 (c)(1),
(2) Date: Sep. 10, 2014

(87) PCT Pub. No.: WO2013/136806
PCT Pub. Date: Sep. 19, 2013

(65) Prior Publication Data
US 2015/0072264 A1    Mar. 12, 2015

(30) Foreign Application Priority Data

Mar. 15, 2012    (JP) ................. 2012-058096

(51) Int. Cl.
*H01M 8/0273*    (2016.01)
*H01M 8/02*    (2016.01)
(Continued)

(52) U.S. Cl.
CPC ....... *H01M 8/1004* (2013.01); *H01M 8/0232* (2013.01); *H01M 8/0234* (2013.01);
(Continued)

(58) Field of Classification Search
None
See application file for complete search history.

(56) References Cited

U.S. PATENT DOCUMENTS 8,192,896 B2    6/2012    Yamauchi et al.
8,486,578 B2 *    7/2013    Ishida ................. H01M 8/0273
                                                         429/480
(Continued)

FOREIGN PATENT DOCUMENTS

CN    101632192 A    1/2010
CN    102197527 A    9/2011
(Continued)

*Primary Examiner* — Tracy Dove
(74) *Attorney, Agent, or Firm* — Foley & Lardner LLP

(57) ABSTRACT

A fuel cell includes: a membrane electrode assembly including an electrolyte membrane, catalyst layers stacked on both sides of the electrolyte membrane, and two or more porous bodies having different moduli of elasticity and provided on a surface of one of the catalyst layers; a separator defining a gas flow passage between the separator and the membrane electrode assembly; and a frame body surrounding an outer periphery of the electrolyte membrane. A porous body adjacent to the separator out of the two or more porous bodies includes an outer edge portion including an outer extending portion extending to overlap with the frame body. An elastic body is provided between the outer extending portion and the frame body.

8 Claims, 5 Drawing Sheets

(51) Int. Cl.
  *H01M 8/1004* (2016.01)
  *H01M 8/0232* (2016.01)
  *H01M 8/0234* (2016.01)
  *H01M 8/0245* (2016.01)
  *H01M 8/0284* (2016.01)
  *H01M 8/1018* (2016.01)
  *H01M 8/1007* (2016.01)

(52) U.S. Cl.
  CPC ....... *H01M 8/0245* (2013.01); *H01M 8/0273* (2013.01); *H01M 8/0284* (2013.01); *H01M 8/1007* (2016.02); *H01M 2008/1095* (2013.01)

(56) References Cited

U.S. PATENT DOCUMENTS

| | | |
|---|---|---|
| 8,628,894 B2 | 1/2014 | Shimazoe et al. |
| 2007/0026288 A1 | 2/2007 | Friedman |
| 2009/0087713 A1* | 4/2009 | Yoshida ............... H01M 4/881 429/483 |
| 2010/0104913 A1 | 4/2010 | Yamauchi et al. |
| 2011/0200911 A1 | 8/2011 | Shimazoe et al. |
| 2011/0275003 A1* | 11/2011 | Udatsu ............... H01M 4/8605 429/479 |

FOREIGN PATENT DOCUMENTS

| | | |
|---|---|---|
| EP | 2 131 429 A1 | 12/2009 |
| EP | 2 341 573 A1 | 7/2011 |
| JP | 2007-329083 A | 12/2007 |
| WO | WO 2008/126350 A1 | 10/2008 |

* cited by examiner

[Fig. 1]
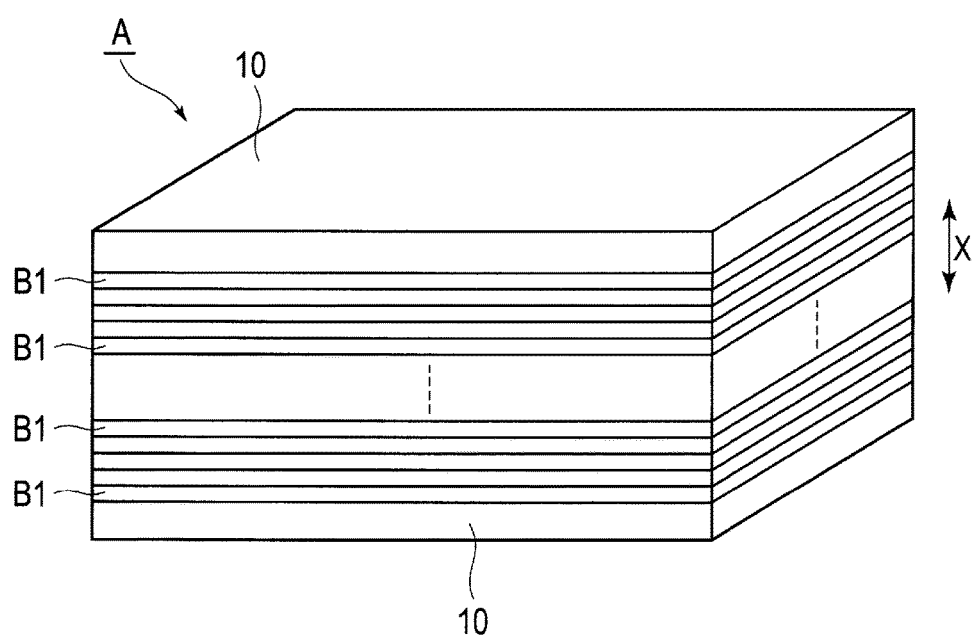

[Fig. 2A]
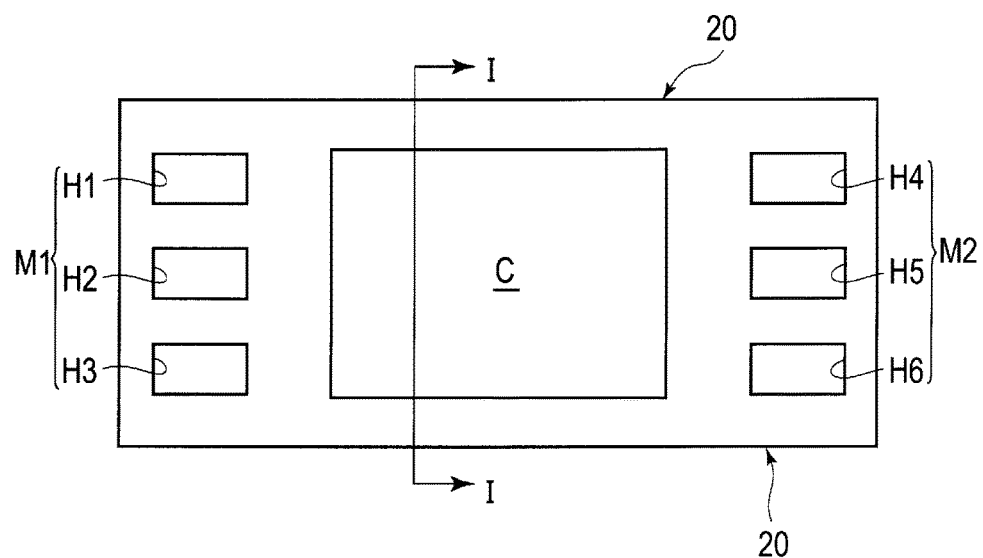
[Fig. 2B]
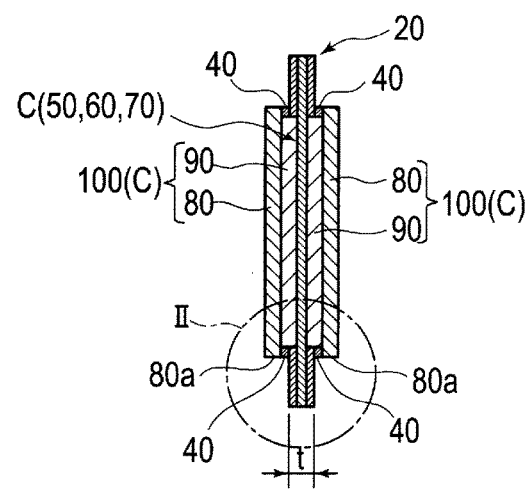

[Fig. 3]
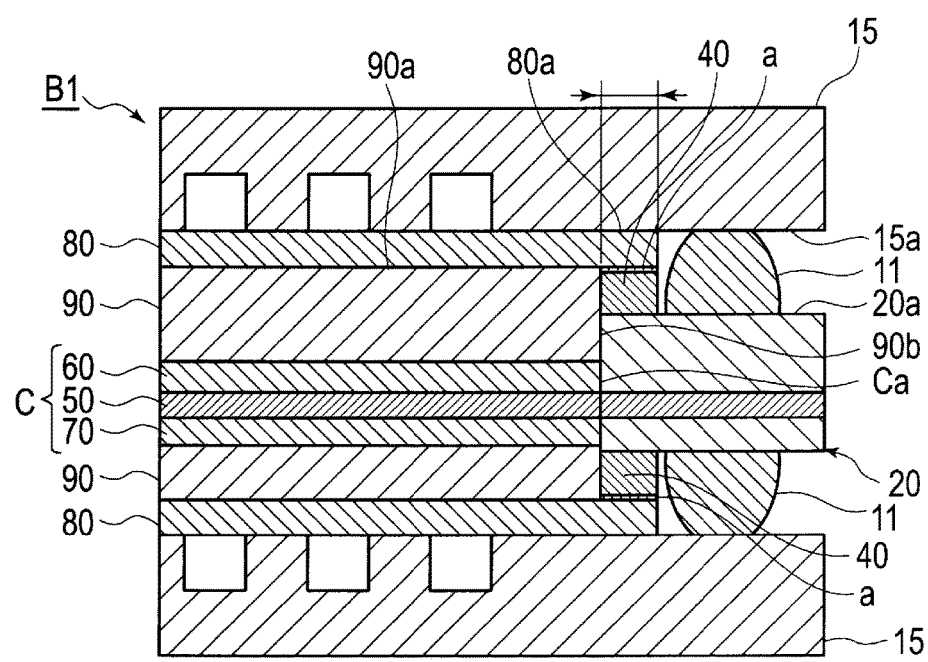

[Fig. 4]
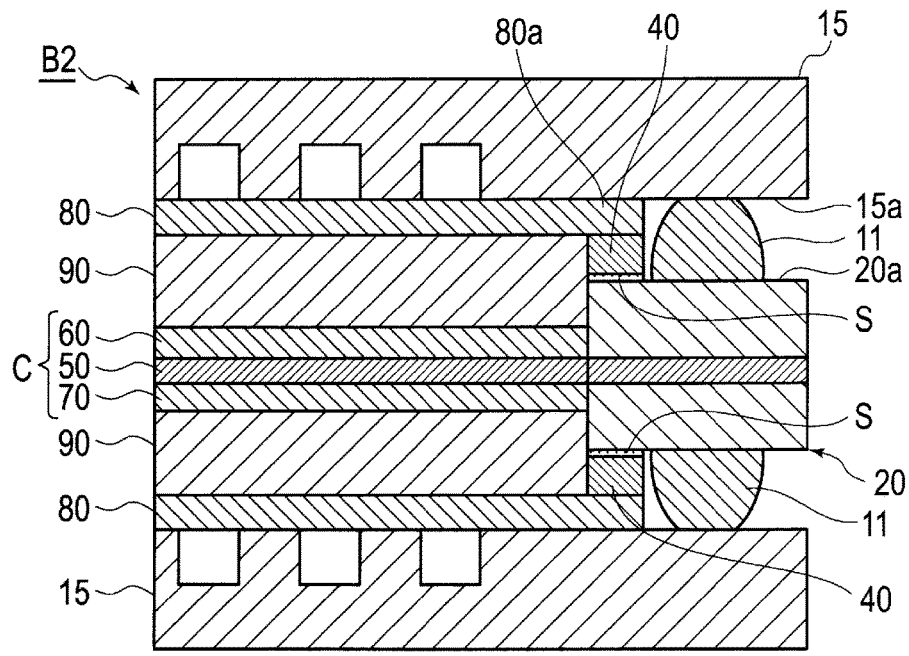
[Fig. 5]
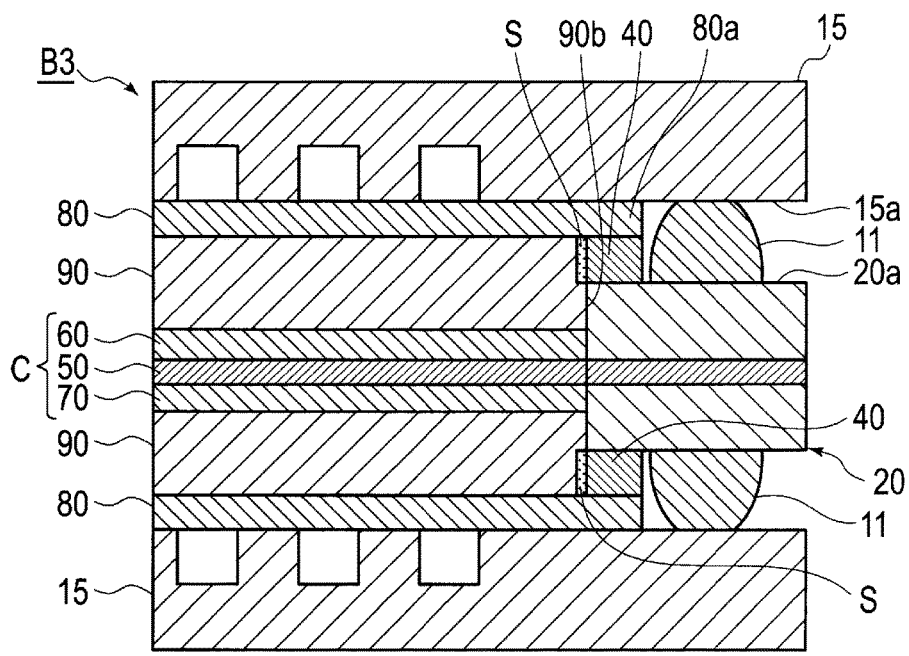

[Fig. 6]
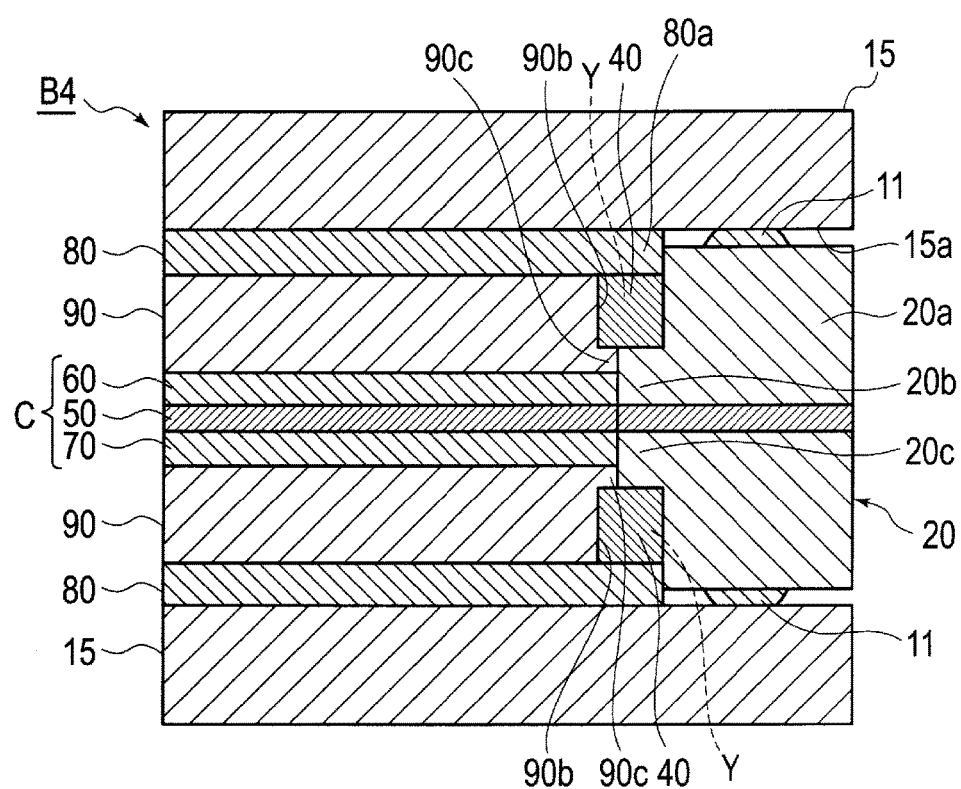

FUEL CELL

TECHNICAL FIELD

The present invention relates to a fuel cell such as a polymer electrolyte fuel cell (hereinafter called "PEFC").

BACKGROUND ART

Technologies related to this type of fuel cell include what is disclosed in Patent Literature 1, titled a "membrane-electrode assembly."

The membrane-electrode assembly disclosed in Patent Literature 1 includes a membrane-membrane reinforcing member assembly, an anode catalyst layer (or a first catalyst layer), a cathode catalyst layer (or a second catalyst layer), an anode gas diffusion layer (or a first gas diffusion layer), and a cathode gas diffusion layer (or a second gas diffusion layer).

The membrane-membrane reinforcing member assembly includes a polymer electrolyte membrane, one or more flaky first membrane reinforcing members disposed on top of a principal surface of the polymer electrolyte membrane in such a way as to extend along the periphery of the polymer electrolyte membrane as a whole, and one or more flaky second membrane reinforcing members disposed on top of the first membrane reinforcing member in such a way as to extend along the periphery of the polymer electrolyte membrane as a whole and to have its inner periphery shifted from the inner periphery of the first membrane reinforcing member, as seen from a thickness direction of the polymer electrolyte membrane. Incidentally, the first membrane reinforcing member and the second membrane reinforcing member are mainly made of synthetic resin.

The anode catalyst layer is formed to cover the principal surface of the polymer electrolyte membrane while filling in an opening formed in the first membrane reinforcing member, and likewise, the cathode catalyst layer is formed to cover the principal surface of the polymer electrolyte membrane. The anode gas diffusion layer is disposed to cover the anode catalyst layer and a portion of a principal surface of the first membrane reinforcing member, and the cathode gas diffusion layer is disposed to cover the cathode catalyst layer and a portion of the principal surface of the first membrane reinforcing member.

The above-described configuration is intended to increase durability by preventing damage to the polymer electrolyte membrane by contact with an end portion of the gas diffusion layer, and by more reliably suppressing damage to the polymer electrolyte membrane by an end portion of the first membrane reinforcing member.

CITATION LIST

Patent Literature

[PTL 1] International Patent Application Publication No. WO/2008/126350

SUMMARY OF INVENTION

In this connection, studies have recently been made on the use of a porous metallic material rather than a carbon material as a material for the gas diffusion layer for the purpose of size reduction of a fuel cell. When the porous metallic material is used for the gas diffusion layer and the gas diffusion layer is disposed to cover the first membrane reinforcing member as disclosed in Patent Literature 1, an excessive surface pressure acts on an overlapping portion of the gas diffusion layer and the first membrane reinforcing member (or a peripheral portion of the polymer electrolyte membrane) and hence it is difficult to ensure a proper surface pressure on the polymer electrolyte membrane on which the catalyst layer is formed, and this problem remains unsolved.

An object of the present invention is to provide a fuel cell capable of ensuring a proper surface pressure on a polymer electrolyte membrane by preventing an excessive surface pressure from being exerted on a peripheral portion of the polymer electrolyte membrane.

A fuel cell in accordance with some embodiments includes: a membrane electrode assembly including an electrolyte membrane, catalyst layers stacked on both sides of the electrolyte membrane, and two or more porous bodies having different moduli of elasticity and provided on a surface of one of the catalyst layers; a separator defining a gas flow passage between the separator and the membrane electrode assembly; and a frame body surrounding an outer periphery of the electrolyte membrane. A porous body adjacent to the separator out of the two or more porous bodies includes an outer edge portion including an outer extending portion extending to overlap with the frame body. An elastic body is provided between the outer extending portion and the frame body.

BRIEF DESCRIPTION OF DRAWINGS

FIG. 1 is a perspective view of a fuel cell stack formed by stacking fuel cells according to a first embodiment of the present invention.

FIG. 2A is a plan view of a frame body and a membrane electrode assembly which form part of the fuel cell according to the first embodiment of the present invention.

FIG. 2B is a cross-sectional view taken along arrowed line I-I of FIG. 2A.

FIG. 3 is an enlarged partial view illustrating details of a portion of the fuel cell corresponding to an area encircled by chain line II in FIG. 2B.

FIG. 4 is an enlarged partial view of a fuel cell according to a second embodiment of the present invention, corresponding to the area encircled by chain line II in FIG. 2B.

FIG. 5 is an enlarged partial view of a fuel cell according to a third embodiment of the present invention, corresponding to the area encircled by chain line II in FIG. 2B.

FIG. 6 is an enlarged partial view of a fuel cell according to a fourth embodiment of the present invention, corresponding to the area encircled by chain line II in FIG. 2B.

DESCRIPTION OF EMBODIMENTS

Embodiments of the present invention will be described below with reference to the drawings. FIG. 1 is a perspective view of a fuel cell stack formed by stacking fuel cells according to a first embodiment of the present invention; FIG. 2A is a plan view of a frame body and a membrane electrode assembly which form part of the fuel cell according to the first embodiment of the present invention; FIG. 2B is a cross-sectional view taken along arrowed line I-I of FIG. 2A; and FIG. 3 is an enlarged partial view illustrating details of a portion of the fuel cell corresponding to an area encircled by chain line II in FIG. 2B. Incidentally, a separator and a sealing compound are additionally illustrated in FIG. 3.

A fuel cell stack A is formed by stacking plural fuel cells B1 according to the first embodiment of the present invention, and the fuel cell stack A is configured so that the fuel cells B1 are stacked one on top of another between a pair of end plates 10, 10 and the fuel cells B1 are pressed together by the end plates 10, 10 with the fuel cells B1 sandwiched in between the end plates 10, 10.

The fuel cell B1 is provided with a membrane electrode assembly C and a frame body 20 (hereinafter called a "frame") interposed between a pair of separators 15, 15 illustrated in FIG. 3 in such a manner as to define gas flow passages through which gases for power generation flow. Incidentally, a gasket may be adopted as the frame body in place of the frame. The "gases for power generation" include a hydrogen-containing gas and an oxygen-containing gas.

The frame 20 is made of resin, and, in the first embodiment, the frame 20 is formed in an oblong rectangular shape in a front view as seen from a stacking direction X of the fuel cells B1 illustrated in FIG. 1, and with a certain plate thickness t greater than that of the membrane electrode assembly C to be described later, and the membrane electrode assembly C is disposed in a central portion of the frame 20. Also, an inner wall surface of the frame 20 which abuts against an outer wall surface of the membrane electrode assembly C is formed flat.

As illustrated in FIG. 2A, the frame 20 is provided with manifold portions M1, M2 for supply and discharge of the hydrogen-containing gas or the oxygen-containing gas or a cooling fluid, which are formed in side portions, respectively, of the frame 20. The manifold portion M1 in one of the side portions is formed of manifold holes H1 to H3. The manifold holes H1 to H3 are for supply of the oxygen-containing gas (H1), for supply of the cooling fluid (H2), and for supply of the hydrogen-containing gas (H3), respectively, and form flow paths, respectively, in the stacking direction X illustrated in FIG. 1.

The other manifold portion M2 is formed of manifold holes H4 to H6. The manifold holes H4 to H6 are for discharge of the hydrogen-containing gas (H4), for discharge of the cooling fluid (H5), and for discharge of the oxygen-containing gas (H6), respectively, and form flow paths, respectively, in the stacking direction X described above. Incidentally, the relative positions of the manifold holes for supply and the manifold holes for discharge may be partially or wholly in reverse order.

As illustrated in FIG. 3, sealants 11, 11 are extendedly formed on upper and lower surfaces, respectively, of the frame 20 between the upper and lower surfaces and lower surfaces 15a of the separators 15, and also, elastic bodies 40, 40 are extendedly formed on the upper and lower surfaces, respectively, in an inner peripheral portion of the frame 20.

The membrane electrode assembly C is sometimes called MEA (Membrane Electrode Assembly), and, as illustrated in FIG. 3, the membrane electrode assembly C has a structure in which an electrolyte membrane 50 formed of a solid polymer, for example, is held between a pair of catalyst layers 60, 70 with the electrolyte membrane 50 sandwiched between the catalyst layers 60, 70 and gas diffusion layers 100 are formed on the catalyst layers 60, 70 in such a way as to coat their surfaces. An outer periphery of the electrolyte membrane 50 is surrounded by the frame 20.

The gas diffusion layer 100 includes first and second porous bodies 80, 90 having different moduli of elasticity. As illustrated in FIGS. 2B and 3, the first and second porous bodies 80, 90 are stacked one on top of another with the second porous body 90 located adjacent to the catalyst layer 60 or 70 and with the first porous body 80 located adjacent to the separator 15.

The second porous body 90 is formed in such a manner that a side surface 90b of the second porous body 90 is flush with a sidewall surface Ca (or a boundary surface) of the catalyst layers 60, 70 and an upper surface 90a of the second porous body 90 is higher in level than an upper surface 20a of the frame 20.

As illustrated in FIG. 3, an outer edge portion of the first porous body 80 extends out toward an inner edge portion of the frame 20, and this extending portion forms an outer extending portion 80a. In other words, as illustrated in FIG. 3, the outer extending portion 80a extends out with a gap between the outer extending portion 80a and the upper surface 20a of the frame 20. The elastic body 40 described above is arranged between the outer extending portion 80a extending out and the upper surface 20a of the frame 20.

The elastic body 40 is formed of a material or materials selected from the group consisting of a carbon material, a spring, an elastomer, rubber, an adhesive, and a composite of these. The elastic body 40 has a lower modulus of elasticity than moduli of compressive elasticity of the first porous body 80 and the frame 20. In the first embodiment, the elastic body 40 is formed integrally with a lower surface of the outer extending portion 80a of the first porous body 80 with an adhesive a interposed in between. Also, the sealant 11 is arranged outside the elastic body 40 and between the upper surface 20a of the frame 20 and the lower surface 15a of the separator 15.

In the first embodiment, the modulus of compressive elasticity of the first porous body 80 is higher than a modulus of compressive elasticity of the second porous body 90. The first porous body 80 is formed of a material or materials selected from the group consisting of iron, stainless steel, aluminum, aluminum alloys, titanium, titanium alloys, chromium, chromium alloys, nickel, nickel alloys, magnesium, magnesium alloys, and combinations of these. Also, the first porous body 80 is constructed of metal mesh, punching metal, etching metal, expanded metal, or the like. Also, the second porous body 90 is formed of a carbon material.

According to the fuel cell B1 having the above-described configuration, the following effects can be achieved.

The elastic body 40 accommodates a surface pressure acting between the outer extending portion 80a of the porous body and the frame 20 and prevents an excessive surface pressure from acting on a portion therebetween, thereby ensuring a proper surface pressure on the electrolyte membrane 50 on which the catalyst layers 60, 70 are formed.

The outer extending portion 80a of the first porous body 80 extends out toward the inner edge portion of the frame 20, thus preventing an end portion of the first porous body 80 from contacting the electrolyte membrane 50 and causing damage to the electrolyte membrane 50. Also, the outer extending portion 80a of the first porous body 80 suppresses a differential pressure between a cathode and an anode or variations in the frame 20 due to swelling and shrinkage of the electrolyte membrane 50, thus relieving stress concentration on the electrolyte membrane 50 at the boundary surface between the catalyst layers 60, 70 and the frame 20.

Also, the modulus of compressive elasticity of the first porous body 80 is higher than the modulus of compressive elasticity of the second porous body 90, and thus, the elastic body 40 can accommodate a surface pressure more effectively.

The elastic body 40 has a lower modulus of elasticity than the moduli of compressive elasticity of the first porous body 80 and the frame 20 and thus enables preventing an excessive surface pressure from acting between the outer extending portion 80a of the porous body and the frame 20 at the time of stacking.

The elastic body 40 is formed integrally with the first porous body 80, which in turn facilitates positioning at the time of stacking and also enables the elastic body 40 to improve in its effect of surface pressure accommodation or variation accommodation.

Next, description will be given with reference to FIGS. 4 to 6 with regard to fuel cells according to second to fourth embodiments. FIGS. 4 to 6 are enlarged partial views of the fuel cells according to the second to fourth embodiments, respectively, corresponding to the area encircled by chain line II in FIG. 2B. Incidentally, corresponding parts to those described for the above-mentioned embodiment are designated by the same reference numerals, and description of the corresponding parts will be omitted.

In a fuel cell B2 according to the second embodiment illustrated in FIG. 4, the elastic body 40 is integrally fixed to the frame 20 by an adhesive s.

Also, a configuration may be adopted in which the equivalent of the elastic body 40 is formed integrally with a side edge portion of the frame 20. The elastic body 40 is formed integrally with the frame 20 to thus facilitate positioning at the time of stacking.

In a fuel cell B3 according to the third embodiment illustrated in FIG. 5, the elastic body 40 is integrally fixed to the side surface 90b of the second porous body 90 by an adhesive s. The elastic body 40 is formed integrally with the second porous body 90 to thus facilitate positioning at the time of stacking.

In a fuel cell B4 according to the fourth embodiment illustrated in FIG. 6, flange portions 20b, 20c protruding inwardly are formed throughout the periphery in upper and lower inner edge portions, respectively, of the frame 20 between which the electrolyte membrane 50 is sandwiched in, and flange portions 90c, 90c are formed on the side surfaces 90b, 90b of the second porous bodies 90, 90, respectively.

In other words, elastic body fitting recess portions Y are defined between the frame 20 and the side surfaces 90b of the second porous bodies 90 by the flange portions 90c, 90c of the second porous bodies 90, 90, and the flange portions 20b, 20c of the frame 20 abutting and facing the flange portions 90c, 90c, respectively, and the elastic bodies 40, 40 are fitted in the elastic body fitting recess portions, respectively.

According to the present invention, the elastic body inserted between the outer extending portion of the porous body adjacent to the separator and the frame body accommodates a surface pressure acting between the outer extending portion of the porous body and the frame body and prevents an excessive surface pressure from acting on a portion therebetween, thereby ensuring a proper surface pressure on the electrolyte membrane on which the catalyst layers are formed.

The entire content of Japanese Patent Application No. 2012-058096 (filed on Mar. 15, 2012) is herein incorporated by reference.

Although the present invention has been described above by reference to the embodiments and the example, the present invention is not limited to those, and it will be apparent to these skilled in the art that various modifications and improvements can be made.

REFERENCE SIGNS LIST 15 separator
20 frame body (frame)
40 elastic body
50 electrolyte membrane
60, 70 catalyst layers
80, 90 porous bodies (first and second porous bodies)
80a outer extending portion
C membrane electrode assembly

The invention claimed is:

1. A fuel cell comprising:
a membrane electrode assembly comprising
an electrolyte membrane,
catalyst layers stacked on both sides of the electrolyte membrane in a stacking direction, and
two or more porous bodies having different moduli of elasticity and provided on a surface of one of the catalyst layers;
a separator defining a gas flow passage between the separator and the membrane electrode assembly; and
a frame body surrounding an outer periphery of the electrolyte membrane,
wherein a porous body adjacent to the separator of the two or more porous bodies comprises an outer extending portion extending out along a direction perpendicular to the stacking direction with a gap between the outer extending portion and an upper surface of the frame body in the stacking direction,
wherein an elastic body is provided in the gap,
wherein the porous body which is adjacent to the separator and the frame body are not in direct contact with each other in the stacking direction, and
wherein the elastic body has a lower modulus of elasticity than a modulus of elasticity of the porous body adjacent to the separator and a modulus of elasticity of the frame body.

2. The fuel cell according to claim 1,
wherein the porous body which is adjacent to the separator of the two or more porous bodies is a first porous body,
wherein a second porous body is stacked adjacent to the one of the catalyst layers, and
wherein the first porous body and the second porous body have different moduli of elasticity.

3. The fuel cell according to claim 2, wherein the first porous body has a higher modulus of compressive elasticity than a modulus of compressive elasticity of the second porous body.

4. The fuel cell according to claim 2, wherein the elastic body is formed integrally with at least one of the first porous body, the second porous body, or the frame body.

5. The fuel cell according to claim 1, wherein the elastic body is selected from the group consisting of a carbon material, a spring, an elastomer, a rubber, an adhesive, and combinations thereof.

6. The fuel cell according to claim 2, wherein the first porous body is selected from the group consisting of iron, stainless steel, aluminum, aluminum alloys, titanium, titanium alloys, chromium, chromium alloys, nickel, nickel alloys, magnesium, magnesium alloys, and combinations thereof.

7. The fuel cell according to claim 2, wherein the second porous body is made of a carbon material.

8. A fuel cell comprising:
a membrane electrode assembly comprising
an electrolyte membrane,
catalyst layers stacked on both sides of the electrolyte membrane in a stacking direction, and two or more porous bodies having different moduli of elasticity and provided on a surface of one of the catalyst layers;

a separator defining a gas flow passage between the separator and the membrane electrode assembly; and a frame body surrounding an outer periphery of the electrolyte membrane, wherein a porous body adjacent to the separator of the two or more porous bodies comprises an outer extending portion extending out along a direction perpendicular to the stacking direction with a gap between the outer extending portion and an upper surface of the frame body in the stacking direction, wherein an elastic body is provided in the gap, wherein the porous body which is adjacent to the separator and the frame body are not in direct contact with each other in the stacking direction, and wherein the first porous body is selected from the group consisting of iron, stainless steel, aluminum, aluminum alloys, titanium, titanium alloys, chromium, chromium alloys, nickel, nickel alloys, magnesium, magnesium alloys, and combinations thereof.

* * * * *